US008396050B2

(12) United States Patent
Yang et al.

(10) Patent No.: US 8,396,050 B2
(45) Date of Patent: Mar. 12, 2013

(54) TECHNIQUES FOR FEMTO CELL SYNCHRONIZATION IN WIRELESS NETWORKS

(75) Inventors: Xiangying Yang, Portland, OR (US); Muthaiah Muthu Venkatachalam, Beaverton, OR (US); Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 436 days.

(21) Appl. No.: 12/653,816

(22) Filed: Dec. 21, 2009

(65) Prior Publication Data
US 2010/0157906 A1 Jun. 24, 2010

Related U.S. Application Data

(63) Continuation-in-part of application No. 12/384,502, filed on Apr. 6, 2009.

(60) Provisional application No. 61/110,544, filed on Oct. 31, 2008.

(51) Int. Cl.
 *H04J 3/06* (2006.01)
 *H04B 15/00* (2006.01)
(52) U.S. Cl. .................... 370/350; 370/503; 455/502
(58) Field of Classification Search .............. 370/338, 370/342–345, 503; 375/145, 149, 354–368
See application file for complete search history.

(56) References Cited

U.S. PATENT DOCUMENTS

| | | | | |
|---|---|---|---|---|
| 2009/0247181 | A1* | 10/2009 | Palanki et al. | 455/452.2 |
| 2010/0054237 | A1* | 3/2010 | Han et al. | 370/350 |
| 2010/0120438 | A1* | 5/2010 | Kone et al. | 455/444 |
| 2010/0157906 | A1* | 6/2010 | Yang et al. | 370/328 |
| 2010/0195627 | A1* | 8/2010 | Sundarraman et al. | 370/336 |
| 2010/0222068 | A1* | 9/2010 | Gaal et al. | 455/450 |
| 2010/0238878 | A1* | 9/2010 | Jang | 370/329 |
| 2010/0255854 | A1* | 10/2010 | Lee et al. | 455/450 |
| 2011/0116481 | A1* | 5/2011 | Wang | 370/336 |
| 2011/0128916 | A1* | 6/2011 | Kwon et al. | 370/328 |
| 2011/0269451 | A1* | 11/2011 | Liu et al. | 455/422.1 |
| 2011/0281571 | A1* | 11/2011 | Patel et al. | 455/418 |
| 2011/0281574 | A1* | 11/2011 | Patel et al. | 455/422.1 |

* cited by examiner

*Primary Examiner* — Thai Hoang
(74) *Attorney, Agent, or Firm* — Kacvinsky Daisak PLLC

(57) ABSTRACT

Techniques are disclosed that provide for femto base stations to become synchronized with other base stations in a wireless network. For instance, a macro base station may instruct a mobile station to engage in a synchronization operation that synchronizes one or more timings (e.g., OFDM timings) of a femto base station with one or more corresponding timings of the macro base station. This may involve the mobile station having timing references of the macro base station. Further, this may involve the mobile station performing scanning operations and/or handover ranging operations with the femto base station. The mobile device may determine timing offsets between the femto BS and the macro BS. These offsets may be sent to the macro base station or to the femto base station. Also, the femto base station may adopt timings employed by the mobile station. The macro base station or a femto base station may direct a femto base station to achieve synchronization either directly with timing adjustment offset, or with a list of already synchronized femto base station as synchronization reference.

17 Claims, 5 Drawing Sheets

TECHNIQUES FOR FEMTO CELL SYNCHRONIZATION IN WIRELESS NETWORKS

RELATED APPLICATIONS

This application is a continuation-in-part of U.S. application Ser. No. 12/384,502, entitled "Techniques to Support Multiple Radio-Access Technologies," filed on Apr. 6, 2009, which claims priority to U.S. Provisional Application Ser. No. 61/110,544, entitled "Advanced Wireless Communication Systems and Techniques," and filed on Oct. 31, 2008. Accordingly, this application claims priority to these previously filed applications for all applicable subject matter. U.S. application Ser. No. 12/384,502 and U.S. Provisional Application Ser. No. 61/110,544 are incorporated herein by reference in their entirety.

BACKGROUND

Wireless communications capabilities are increasingly being integrated into portable devices, including laptop computers, handheld devices (such as personal digital assistants (PDAs)), and mobile phones. The integration of such capabilities can provide users with anywhere and anytime connectivity to information resources.

Many communications systems include multiple base stations dispersed across regions to provide mobile access to network resources. One such system is WiMAX, as provided by the Institute of Electrical and Electronic Engineers (IEEE) 802.16 standards. In WiMAX networks, mobile stations may exchange signals with base stations. These signals may be modulated according to orthogonal frequency division multiplexing (OFDM) techniques.

Communications networks may include different types of base stations (BSs). For example, WiMAX networks provide for macro BSs and femto BSs. Macro base stations offer relatively large coverage areas (called cells) that are suitable for extensive outdoor coverage (and some penetrating indoor coverage). In contrast, femto base stations, which provide small coverage areas (called femto cells) are typically suited for indoor areas like homes and offices.

For networks employing OFDM, synchronization among neighboring BSs is critical. This is because timing offsets between such BSs will incur severe interference. For typical deployments, such as ones employing urban macro cells, synchronization can be maintained with technologies, such as the global positioning system (GPS), that provide accurate timing references.

However, it is likely that indoor femto BSs will be unable to receive GPS signals. Unfortunately, these femto BSs may still have overlay radio coverage with neighboring macro-BSs. Thus, it is desirable to achieve good synchronization between femto BSs and macro BSs.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide techniques for femto cells to become synchronized with other base stations in a wireless network. For instance, a macro base station may instruct a mobile station to engage in a synchronization operation that synchronizes one or more timings (e.g., OFDM timings) of a femto base station with one or more corresponding timings of the macro base station. This may involve the mobile station having timing references of the macro base station. Further, this may involve the mobile station performing scanning operations and/or handover ranging operations with the femto base station.

Moreover, the mobile device may determine timing offsets between the femto BS and the macro BS. These offsets may be sent to the macro base station or the femto base station. Also, the femto base station may adopt timings employed by the mobile station.

Thus, embodiments may provide techniques in which mobile stations assist in the synchronizing of femto-BSs. Such techniques may be employed, for example, where a mobile station is synchronized with a macro-BS. In the context of WiMAX (e.g., IEEE 802.16e systems), such techniques do not require significant changes to existing air link specifications.

As discussed above, obtaining synchronization among base stations is important. Such synchronization is not only desirable for time division duplexing (TDD) modes, but also for certain frequency division duplexing (FDD) modes, such as when downlink (DL) and uplink (UL) sub-bands are close to each other.

Previous synchronization techniques do not perform adequately for establishing base station synchronization in environments employing, for example, OFDM and/or WiMAX. For instance, IEEE standard 1588 specifies synchronization protocols that may be employed among devices in a network. These protocols perform adequately for network devices that are communicating with each other at protocol layer 2, where end-to-end delays do not exhibit much fluctuation.

However, in a layer 3 network, such as in the WiMAX inter-BS case, packet queuing delays can make IEEE 1588 very unreliable. For instance, the accuracy of this protocol can only be roughly the same order of the experienced queueing delay (e.g., tens or even hundreds of milliseconds). In contrast, OFDM network synchronization requires accuracy within a CP length of 1 µs.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
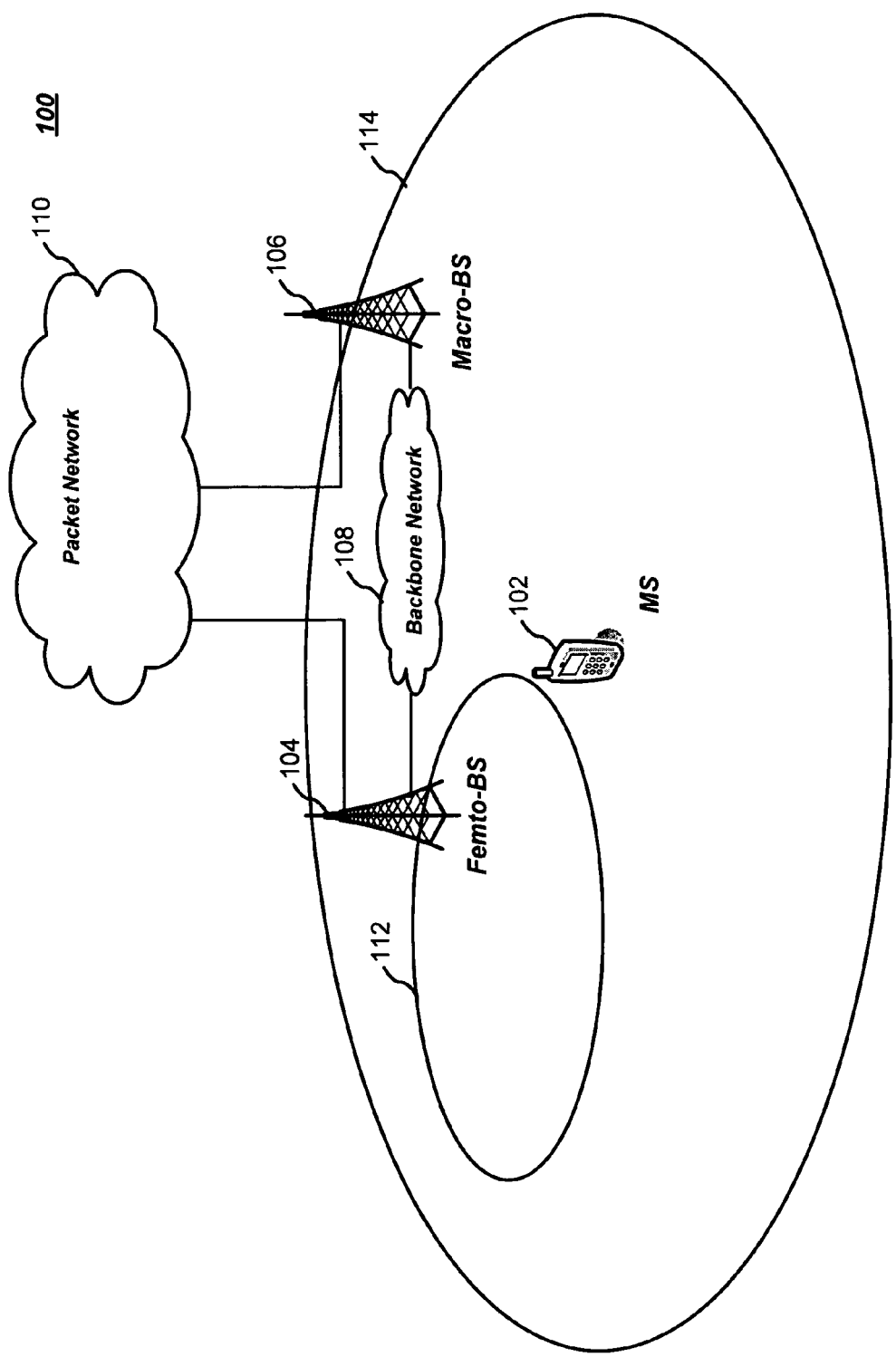
FIG. 1 is a diagram of an exemplary operational environment.

FIG. 1 is a diagram of an exemplary operational environment 100 in which the techniques described herein may be employed. As shown in FIG. 1, this environment includes a mobile station (MS) 102, a femto base station ("femto-BS")

104, and a macro base station ("macro-BS") 106. These elements may each be implemented in any combination of hardware and/or software.

MS 102 provides a user with mobile communications capabilities. Accordingly, MS 102 may be a mobile telephone, a smartphone, a wireless personal digital assistant (PDA), a mobile internet device (MID), a notebook computer, a netbook, a nettop, and so forth. Embodiments are not limited to these examples.

Femto-BS 104 and macro-BS 106 each provides coverage areas that may support communications for wireless devices. For example, FIG. 1 shows femto-BS 104 providing a coverage area (or femto cell) 112 and macro-BS 106 providing a coverage area (or cell) 114.

Mobile communications of MS 102 are facilitated through the exchange of signals with one or more base stations (e.g., femto-BS 104 and/or macro-BS 106). In embodiments, this exchange of wireless signals may be based on a networking standard, such as one or more of the Electrical and Electronics Engineers (IEEE) 802.16 WiMAX standards (e.g., IEEE 802.16e). However, other network types may be employed. Examples of such other network types include (but are not limited to) IEEE 802.11 wireless local area networks (WLANs), long term evolution networks, and so forth.

As shown in FIG. 1, femto-BS 104 and macro-BS 106 are connected by a backbone network 108. This network provides for these base stations to exchange various forms of control information. In embodiments, this control information may include timing adjustment directives sent from macro-BS 106 to femto-BS 104. Such directives may advantageously establish synchronization of femto-BS 104.

In addition, FIG. 1 shows that femto-BS 104 and macro-BS 106 are each coupled to a packet network 110. Packet network 110 may be, for example, the Internet. Accordingly, base stations 104 and 106 may provide MS 102 (as well as any other mobile stations) with access to information and services that are available through packet network 110.

Operations for the embodiments may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Figure 2:
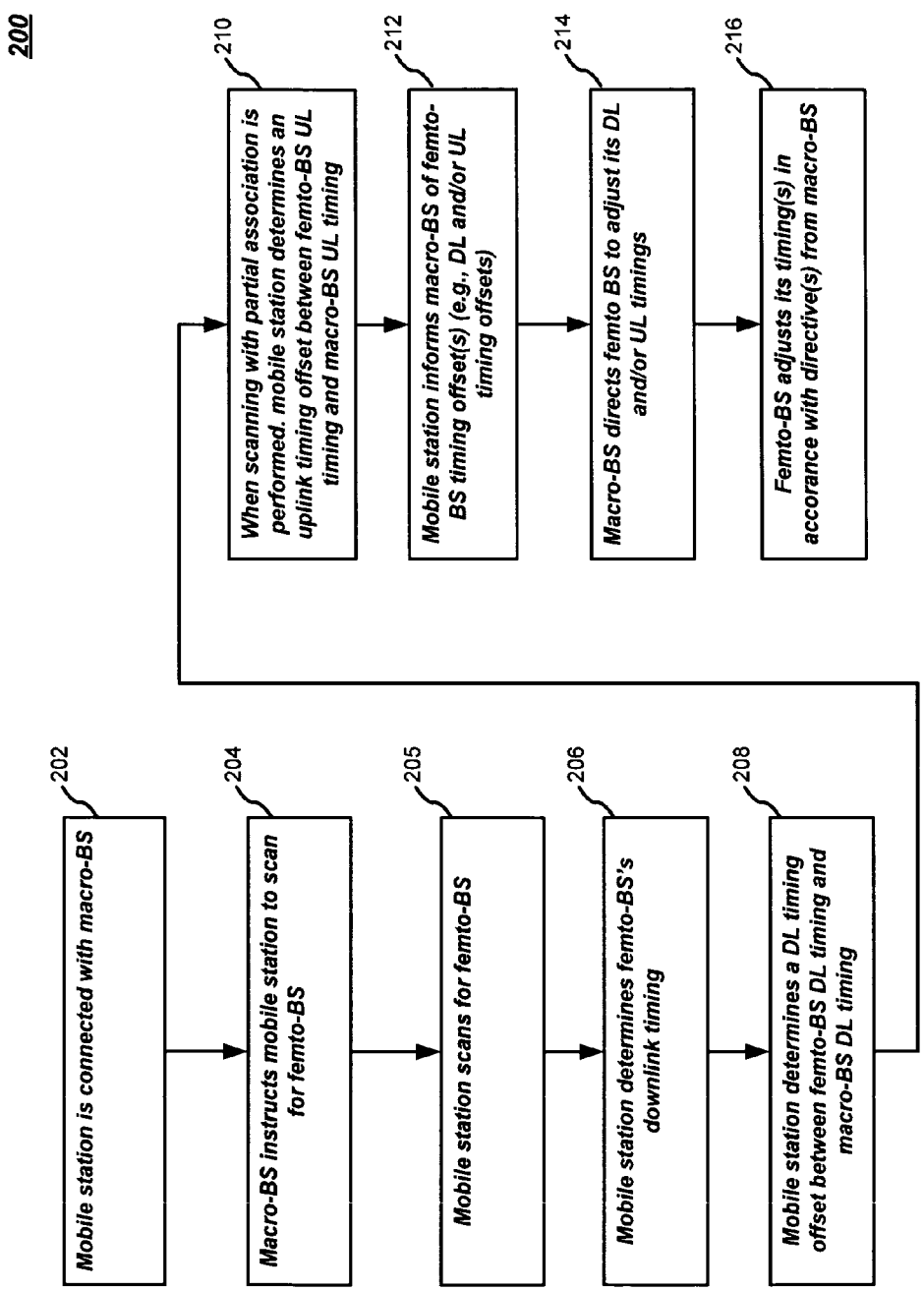
FIGS. 2 and 3 are logic flow diagrams.
Figure 3:
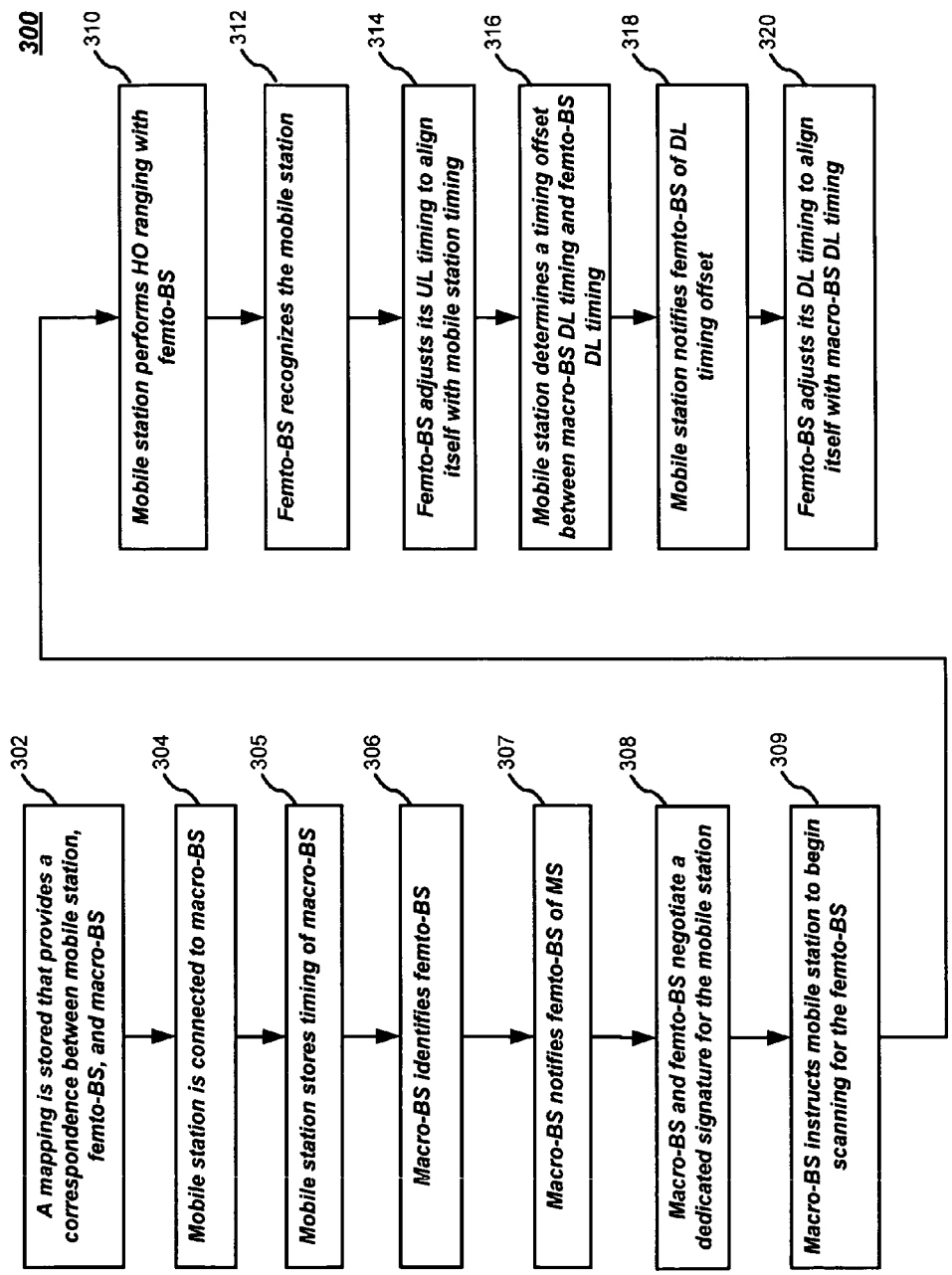

FIGS. 2 and 3 illustrate embodiments of logic flows. In particular, these drawings illustrate logic flows 200 and 300, which may be representative of the operations executed by one or more embodiments described herein. These flows are described in the context of FIG. 1. However, they may be employed in other contexts. Although FIGS. 2 and 3 show particular sequences, other sequences may be employed. Also, the depicted operations may be performed in various parallel and/or sequential combinations.

In particular, FIG. 2 involves MS assisted synchronization through scanning procedures. Scanning procedures are used for an MS to perform topology discovery and to prepare for a future handover (HO). The techniques may be employed in various situations, such as when femto-BS 104 and macro-BS 106 cannot hear each other, but share some overlap in their coverage areas (e.g., on the street).

As shown in FIG. 2, MS 102 is connected with macro-BS 106 at a block 202. At this point, macro-BS 106 may be aware of the location of MS 102. This awareness may come from various techniques. One such technique may involve MS 102 providing macro-BS 106 with a location report. Such a report may be based, for example, on a GPS receiver included within MS 102. Embodiments, however, are not limited to this example.

From this location awareness, macro-BS 106 determines that MS 102 is near or within the coverage area of femto-BS 104. Thus, at a block 204, macro-BS 106 instructs MS 102 to scan for femto-BS 104. Accordingly, MS 102 scans for femto-BS 104 at a block 205.

Based on this scanning, MS 102 detects a synchronization channel (e.g., preamble) transmitted by femto-BS 104. Based on this detection, MS 102 determines the downlink (DL) timing of femto-BS 104 at a block 206. From this, MS 102 determines (at a block 208) a difference between the downlink (DL) timing of femto-BS 104 and the DL timing of macro-BS 106. This difference is referred to herein as a DL timing offset.

In embodiments, MS 102 may also perform uplink synchronization for femto-BS 104. For instance, the scanning operation of block 205 may be a scanning with partial association process. If so, this process allows MS 102 to perform some initial ranging and MAC negotiation with femto-BS 104. Through these activities, MS 102 may determine the UL timing of femto-BS 104. From this, MS 102 may determine a UL timing offset between the UL timing of femto-BS 104 and the UL timing of macro-BS 106. This UL offset may be used to establish UL synchronization for femto-BS 104.

At a block 212, MS 102 notifies macro-BS 106 of the determined timing offset(s) (e.g., DL and/or UL timing offsets). This notification may involve the exchange of one or more messages between MS 102 and macro-BS 106.

Based on this notification, macro-BS 106 directs femto-BS 104 to adjust its downlink (DL) and/or uplink (UL) timing at a block 214. This may involve macro-BS 106 sending one or more messages to femto-BS 104. In the context of FIG. 1, such message(s) may be sent across backbone network 108. However, other techniques may be employed.

Accordingly, at a block 216, femto-BS 104 adjusts it timing(s) in accordance with the directives sent by macro-BS 106.

The logic flow diagram of FIG. 3 involves a mobile station synchronizing a femto base station through handover (HO) techniques. The flow of FIG. 3 includes a block 302, in which a mapping is stored at a block 302. In the context of FIG. 1, this mapping provides a correspondence between MS 102, femto-BS 104, and macro-BS 106.

For instance, MS 102 may store (e.g., cache) a correspondence between its home BS (femto-BS 104) and macro-BS 106. Additionally or alternatively, macro-BS 106 may store (e.g., cache) a correspondence that identifies femto-BS 104 as the home BS for MS 102.

At a block 304, MS 102 becomes connected with macro-BS 106. Based on this connection, MS 102 obtains the timing (both DL and UL) of macro-BS 106. In turn, at a block 305, MS 102 may store (or cache) information that describes (e.g., quantifies) one or both of these timings.

At a block 306, macro-BS 106 identifies femto-BS 104. Macro-BS 106 makes this identification by recognizing the correspondence stored at block 302. Accordingly, if this correspondence is stored by MS 102, block 306 may involve MS 102 accessing the correspondence and sending a corresponding message to macro-BS 106. Alternatively, if this correspondence is stored by macro-BS 106, block 306 may involve macro-BS 106 accessing its own storage.

Based on this identification of femto-BS 104, macro-BS 106 notifies femto-BS 104 about MS 102 at a block 307. This may involve macro-BS 106 providing femto-BS 104 with the media access control (MAC) address of MS 102. In the context of FIG. 1, this notification may involve macro-BS 106 sending femto-BS 104 one or more messages across backbone network 108.

At a block 308, macro-BS 106 and femto-BS 104 negotiate a dedicated signature for MS 102. This dedicated signature allows for femto-BS 104 to recognize and trust MS 102. In embodiments, this signature may be a dedicated ranging code for MS 102. In the context of FIG. 1, block 308 may involve macro-BS 106 and femto-BS 102 exchanging messages across backbone network 108. The employment of a dedicated ranging code (or other signature) is optional. However, its employment provides security in that femto-BS 104 is ensured it will engage in synchronization operations with a MS that is associated with macro-BS 106.

At a block 309, macro-BS 106 instructs MS 102 to initiate scanning for femto-BS 104. This scanning is in preparation for a handover (HO) into femto-BS 104. After, MS 102 (through its scanning) acquires femto-BS 104, a HO into femto-BS 104 commences. This may include MS 102 performing HO ranging with femto-BS 104 at a block 310. This is described below in greater detail below with reference to FIG. 4.

Upon detection of the HO ranging performed by MS 102, femto-BS 104 recognizes MS 102 at a block 312. This recognition may be through MS 102 using the pre-assigned dedicated ranging code that was established at block 308. Alternatively, this recognition may be through MS 102 using some other form of signature associated with the ranging signal. Embodiments are not limited to these examples.

Based on this recognition, femto-BS 104 adjusts its UL timing (at a block 314) to align itself with MS 102. As a result, femto-BS 104 achieves UL synchronization. This is different from a regular ranging process. For instance, in a regular ranging process, an MS adjusts its timing to the base station, as instructed by a RNG-RSP message from the base station (after ranging signaling is sent). However, achieving synchronization at block 314 involves the opposite (the base station adjusts its timing). In the context of WiMAX (e.g., IEEE 802.16e), such procedures do not require changes in the air link. Instead, only femto-BS behavior are changed.

In addition to providing UL synchronization, MS 102 may also provide femto-BS 104 with DL synchronization. For instance, at a block 316, MS 102 calculates a timing offset between the downlink timing of macro-BS 106 (which MS 102 stored at block 305) and the downlink timing of femto-BS 104.

In turn, MS 102 notifies femto-BS 104 of this timing offset at a block 318. This notification may involve MS 102 sending femto-BS 104 one or more messages. For example, in the context of WiMAX (e.g., IEEE 802.16e) networks, such message(s) may comprise a RNG-REQ message.

Upon receipt of this notification, femto-BS 104 (at a block 320) adjusts its timing in accordance with the offset. As a result, DL synchronization is achieved for femto-BS 104.

As described above, femto-BS synchronization may involve HO operations. Further to the logic flow of FIG. 3, an exemplary sequence of interactions between MS 102 and femto BS 104 is shown in FIG. 4.

Figure 4:
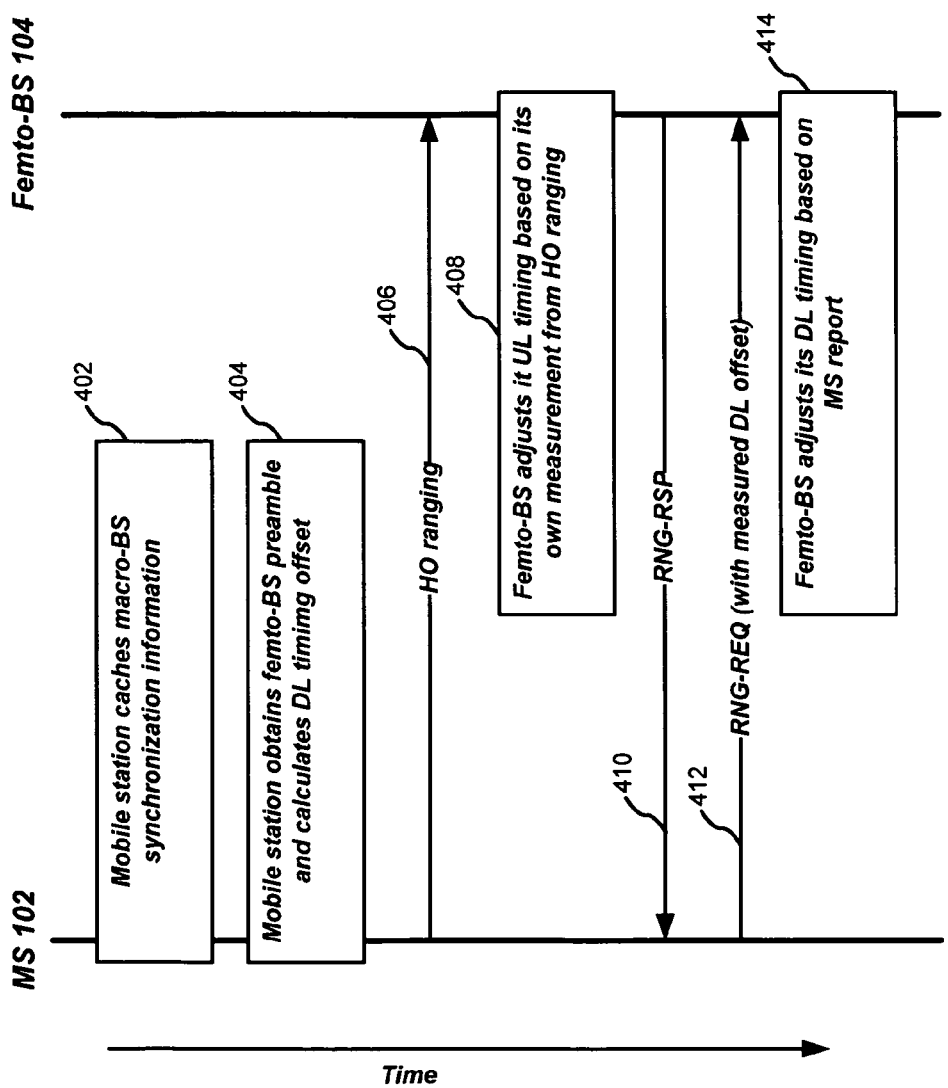
FIG. 4 is a diagram of exemplary handover ranging operations.

For instance, FIG. 4 shows (at a block 402) that MS 102 caches synchronization information for macro-BS 106. Following this, at a block 404, MS 102 obtains the preamble of femto-BS 104 (through scanning) and calculates a DL timing offset.

Also, MS 102 initiates HO ranging operations (at 406). Based on these HO ranging operations, femto-BS 104 adjusts its UL synchronization based on its own measurements at a block 408.

Following this, femto-BS 104 sends a RNG-RSP message 410 to MS 102. In turn, MS 102 sends a RNG-REQ message 412 to femto-BS 104. This RNG-REQ message includes the DL timing offset, which was measured by MS 102. Upon receipt of this message, femto-BS 102 adjusts its DL timing at a block 414.

In addition to the operations described above with reference to FIGS. 2 and 3, embodiments may provide multi-hop synchronization techniques. For instance, a macro-BS or a trusted femto-BS may inform other femto-BSs in the neighborhood (e.g., via backhaul communications path(s)), that one or more femto-BSs have already achieved synchronization with the macro-BS and thus could be used by those unsynchronized femto-BSs as reference for synchronization. This enables synchronization in a multi-hop fashion for those femto-BSs that may not be able to directly receive macro-BS's preamble but could receive neighbor femto-BSs' preamble over the air.

Figure 5:
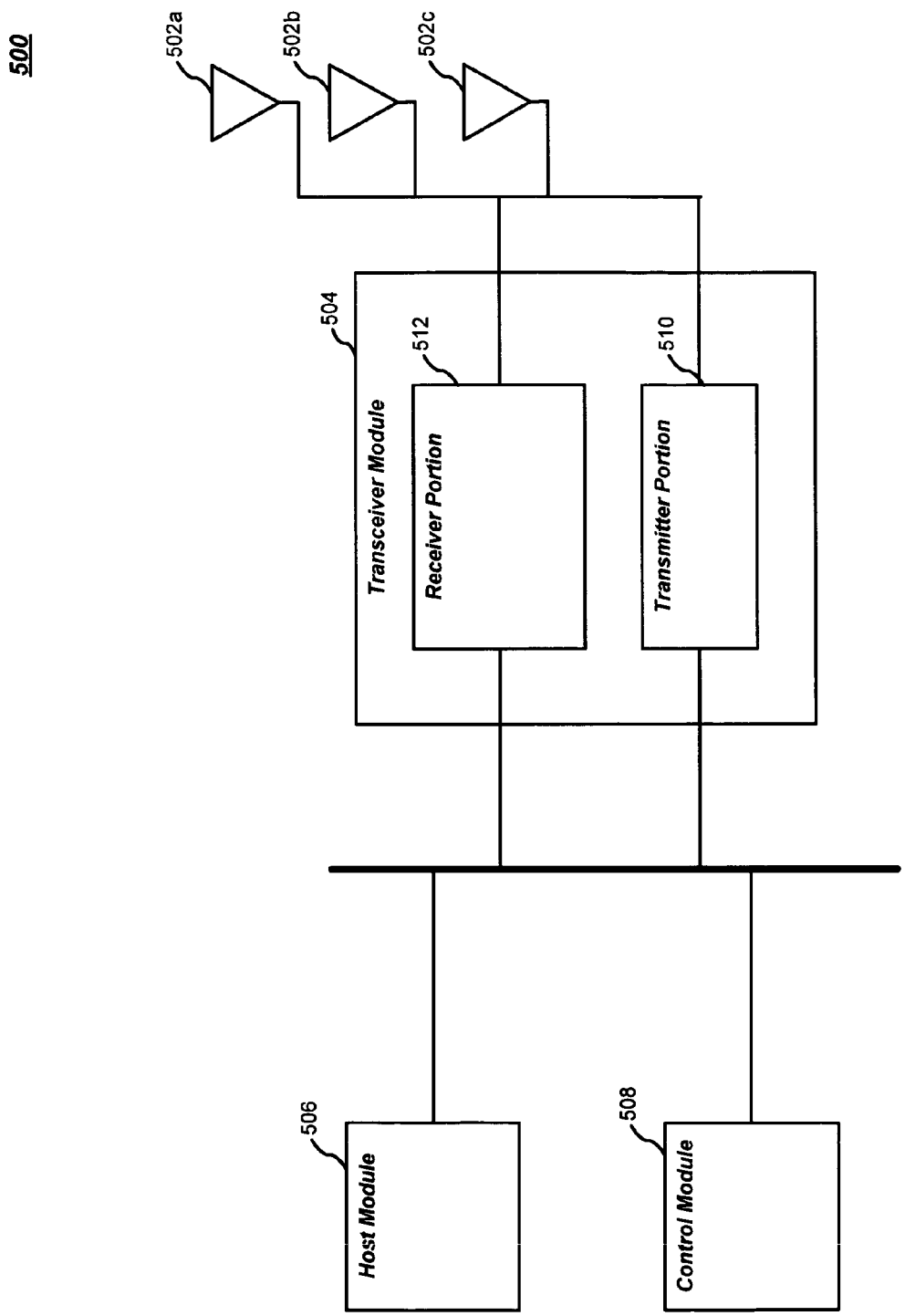
FIG. 5 is a diagram of an exemplary implementation.
Figure 2:
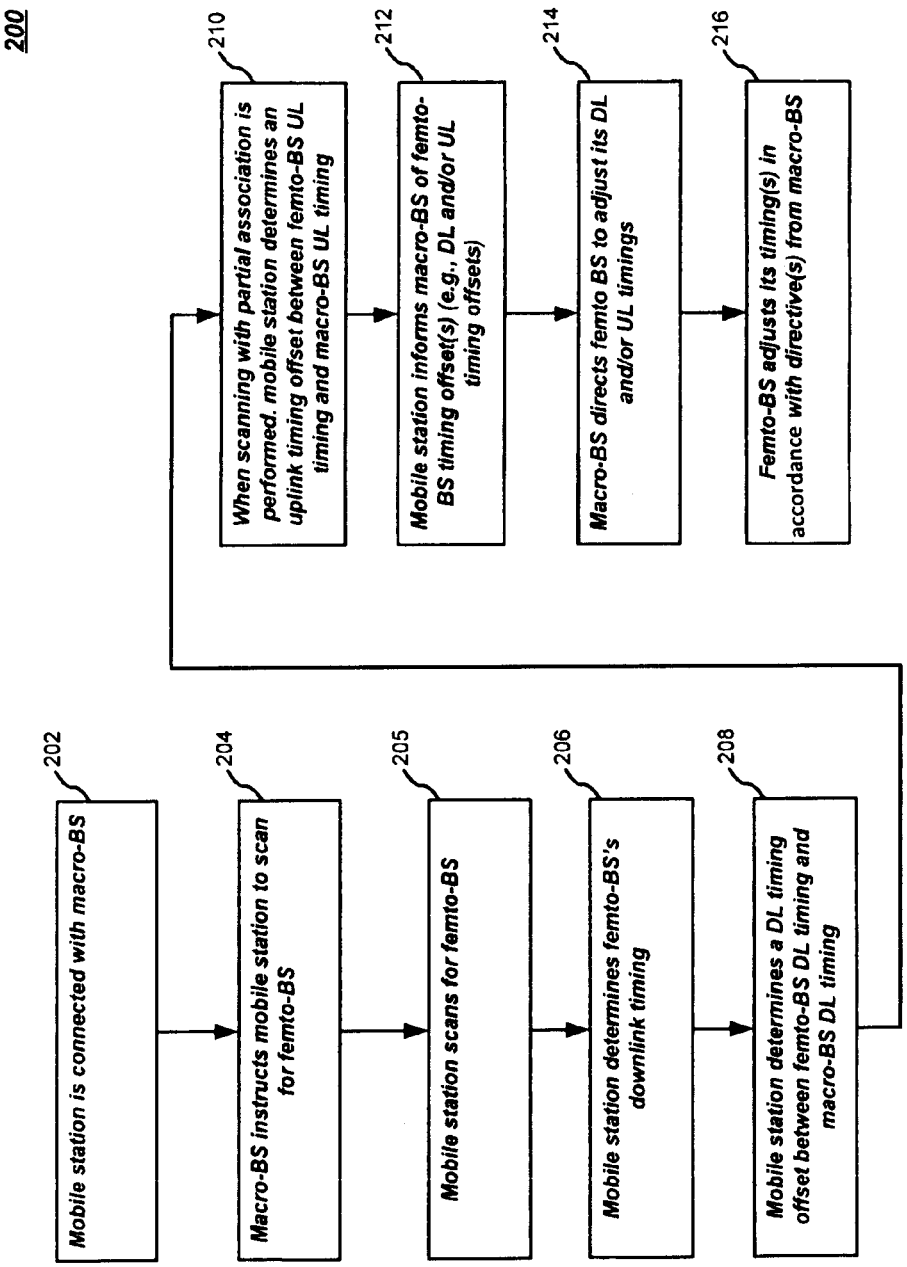

FIG. 5 is a diagram of an implementation 500 that may be included in a wireless device, such as a mobile station (e.g., MS 102) and/or base station (e.g., femto-BS 104 and/or macro-BS 106). Implementation 500 may include various elements. For example, FIG. 5 shows implementation 500 including multiple antennas 502a-c, a transceiver module 504, a host module 506, and a control module 508. These elements may be implemented in hardware, software, or any combination thereof.

Antennas 502a-c provide for the exchange of wireless signals with remote devices. Although three antennas are depicted, any number of antennas may be employed. Also, embodiments may employ one or more transmit antennas and one or more receive antennas. Such multiple antenna arrangements may be employed for beamforming and/or the employment of multiple spatial streams with a remote device.

Transceiver module 504 provides for the exchange of information with other devices. As shown in FIG. 5, transceiver module 504 includes a transmitter portion 510, and a receiver portion 512. During operation, transceiver module 504 provides an interface between antennas 502a-c and other elements, such as host module 506, and control module 508. For instance, transmitter portion 510 receives symbols from such elements, and generates corresponding signals for wireless transmission by one or more of antennas 502a-c. This may involve operations, such as modulation, amplification, and/or filtering. However, other operations may be employed.

Conversely, receiver portion 512 obtains signals received by one or more of antennas 502a-c and generates corresponding symbols. In turn, these symbols may be provided to elements, such as host module 506 and control module 508. This generation of symbols may involve operations, including (but not limited to) demodulation, amplification, and/or filtering.

The signals generated and received by transceiver module 504 may be in various formats. For instance, these signals may be modulated in accordance with an orthogonal frequency division multiplexing (OFDM) scheme. However, other schemes and formats (e.g., QPSK, BPSK, FSK, etc.) may be employed.

To provide such features, transmitter portion 510 and receiver portion 512 may each include various components, such as modulators, demodulators, amplifiers, filters, buffers, upconverters, and/or downconveters. Such components may be implemented in hardware (e.g., electronics), software, or any combination thereof.

The symbols exchanged between transceiver module 504 and other elements may form messages or information associated with one or more protocols, and/or one or more user applications. Thus, these elements may perform operations corresponding to such protocol(s) and/or user application(s). Exemplary protocols include (but are not limited to) various media access control and discovery protocols. Exemplary user applications include telephony, messaging, e-mail, web browsing, content (e.g., video and audio) distribution/reception, and so forth.

Moreover, in transmitting signals, transceiver module 504 may employ various access techniques. For example, transceiver module 504 may employ a duplexing technique, such as time division duplexing (TDD), frequency division duplexing (FDD), and so forth. Embodiments, however, are not limited to such techniques.

In embodiments, control module 508 may perform various operations described herein. For instance, control module 508 may determine and process information involving synchronization operations. Such information may include timing offsets. Also, control module 508 may store information (e.g., correspondences as described above with reference to block 303 of FIG. 3).

Further, control module 508 may generate, receive, and process messages (that are exchanged with other devices through transceiver module 504). Exemplary messages include messages that report timing offsets, messages between macro-BSs and femto-BSs, messages that direct a mobile device to perform synchronization operations, as well as other inter-device exchanges described herein.

Host module 506 may exchange symbols with transceiver module 504 that correspond to wireless signals exchanged with remote devices. These symbols may form messages or information associated with one or more protocols, and/or one or more user applications. Thus, host module 506 may perform operations corresponding to such protocol(s) and/or user application(s). Exemplary protocols include various media access, network, transport and/or session layer protocols. Exemplary user applications include telephony, messaging, e-mail, web browsing, content (e.g., video and audio) distribution/reception, and so forth.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The storage medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For example, the techniques described herein are not limited to WiMAX and IEEE 802.16e networks. Moreover, embodiments are not limited to OFDM transmission techniques or the synchronization of OFDM timings.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

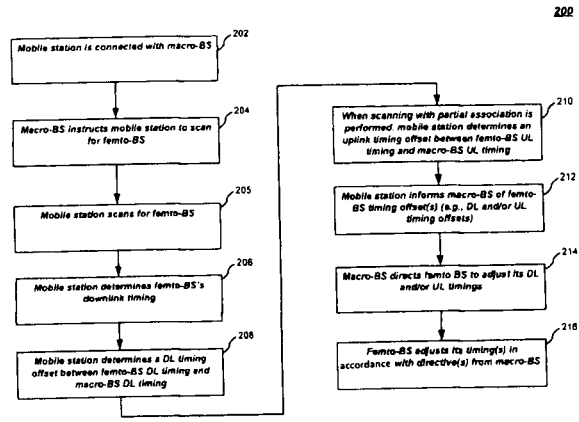

The invention claimed is:

1. An apparatus, comprising:
 a transceiver module to obtain a first downlink timing and a first uplink timing from a macro base station and a second downlink timing and a second uplink timing from a femto base station, the transceiver module to obtain the second downlink timing and the second uplink timing through a scanning operation; and
 a control module to determine a downlink timing offset between the first and second downlink timings and an uplink timing offset between the first and second uplink timings.

2. The apparatus of claim 1, wherein the transceiver module is to send to the macro base station a message comprising the downlink timing offset.

3. The apparatus of claim 1, wherein the scanning operation comprises a scanning with partial association process.

4. The apparatus of claim 1, wherein the transceiver module is to send to the femto base station a message comprising the downlink timing offset.

5. The apparatus of claim 1, wherein the first downlink timing and the second downlink timing are each associated with orthogonal frequency division multiplexing (OFDM).

6. The apparatus of claim 1, wherein the transceiver module is to send the uplink timing offset to the macro base station.

7. The apparatus of claim 6, wherein the first and second uplink timings are each associated with orthogonal frequency division multiplexing (OFDM).

8. A system, comprising:
 a macro base station;
 a femto base station; and a mobile station;
wherein the macro base station is to instruct the mobile station to engage in a synchronization operation, the synchronization operation to synchronize one or more orthogonal frequency division multiplexing (OFDM) timings of the femto base station with one or more OFDM timings of the macro base station, the synchronization operation comprising the mobile station performing handover ranging with the femto base station;
wherein the macro base station informs the femto base station of the mobile station prior to commencement of the synchronization operation.

9. The system of claim 8, wherein the synchronization operation includes the mobile station obtaining one or more OFDM timing references from the macro base station.

10. The system of claim 8, wherein the synchronization operation includes the mobile station scanning for the femto base station.

11. The system of claim 8, wherein the synchronization operation includes the mobile station determining at least one timing offset between an OFDM timing of the macro base station and an OFDM timing of the femto base station.

12. The system of claim 11, wherein the synchronization operation includes:
the mobile station sending the at least one timing offset to the femto base station; and the femto base station adjusting its corresponding timing based on the timing offset.

13. The system of claim 11, wherein the synchronization operation includes: the mobile station sending the at least one timing offset to the macro base station; and the macro base station directing the femto base station to adjust its corresponding timing based on the timing offset.

14. The system of claim 8, comprising a further femto base station; wherein the further femto base station is to adjust one or more of its OFDM timings to the femto base station after the synchronization operation.

15. The system of claim 14, wherein the further femto base station is to adjust the one or more timings based on a direction from the macro base station.

16. A method, comprising:
obtaining, at a mobile station, a first downlink timing and a first uplink timing from a macro base station and a second downlink timing and a second uplink timing from a femto base station, the second downlink timing and the second uplink timing obtained through a scanning operation; and
determining a downlink timing offset between the first and second downlink timings and an uplink timing offset between the first and second uplink timings.

17. The method of claim 16, further comprising the mobile station sending the macro base station a message comprising the downlink timing offset.

* * * * *

UNITED STATES PATENT AND TRADEMARK OFFICE
CERTIFICATE OF CORRECTION

PATENT NO. : 8,396,050 B2  
APPLICATION NO. : 12/653816  
DATED : March 12, 2013  
INVENTOR(S) : Xiangying Yang et al.

Page 1 of 3

It is certified that error appears in the above-identified patent and that said Letters Patent is hereby corrected as shown below:

Delete the title page and substitute the attached title page therefor.

In the Drawings

Delete drawing sheet 2 and substitute the attached drawing sheet 2 therefor.

On sheet 2 of 5, in figure 2, Reference Numeral 216, line 2, delete "accorance" and insert -- accordance --, therefor.

On sheet 4 of 5, in figure 4, Reference Numeral 404, line 2, delete "timimg" and insert -- timing --, therefor.

Signed and Sealed this
Tenth Day of December, 2013

Margaret A. Focarino
*Commissioner for Patents of the United States Patent and Trademark Office*

CERTIFICATE OF CORRECTION (continued)

(12) United States Patent
Yang et al.

(10) Patent No.: US 8,396,050 B2
(45) Date of Patent: Mar. 12, 2013

(54) TECHNIQUES FOR FEMTO CELL SYNCHRONIZATION IN WIRELESS NETWORKS

(75) Inventors: Xiangying Yang, Portland, OR (US); Muthaiah Muthu Venkatachalam, Beaverton, OR (US); Yang-Seok Choi, Portland, OR (US)

(73) Assignee: Intel Corporation, Santa Clara, CA (US)

(*) Notice: Subject to any disclaimer, the term of this patent is extended or adjusted under 35 U.S.C. 154(b) by 436 days.

(21) Appl. No.: 12/653,816

(22) Filed: Dec. 21, 2009

(65) Prior Publication Data

US 2010/0157906 A1 Jun. 24, 2010

Related U.S. Application Data

(63) Continuation-in-part of application No. 12/384,502, filed on Apr. 6, 2009.

(60) Provisional application No. 61/110,544, filed on Oct. 31, 2008.

(51) Int. Cl.
*H04J 3/06* (2006.01)
*H04B 15/00* (2006.01)

(52) U.S. Cl. .................. 370/350; 370/503; 455/502

(58) Field of Classification Search .................. 370/338, 370/342–345, 503; 375/145, 149, 354–368
See application file for complete search history.

(56) References Cited

U.S. PATENT DOCUMENTS

| | | | |
|---|---|---|---|
| 2009/0247181 A1* | 10/2009 | Palanki et al. | 455/452.2 |
| 2010/0054237 A1* | 3/2010 | Han et al. | 370/350 |
| 2010/0120438 A1* | 5/2010 | Kone et al. | 455/444 |
| 2010/0157906 A1* | 6/2010 | Yang et al. | 370/328 |
| 2010/0195627 A1* | 8/2010 | Sundarraman et al. | 370/336 |
| 2010/0222068 A1* | 9/2010 | Gaal et al. | 455/450 |
| 2010/0238878 A1* | 9/2010 | Jang | 370/329 |
| 2010/0255854 A1* | 10/2010 | Lee et al. | 455/450 |
| 2011/0116481 A1* | 5/2011 | Wang | 370/336 |
| 2011/0128916 A1* | 6/2011 | Kwon et al. | 370/328 |
| 2011/0269451 A1* | 11/2011 | Liu et al. | 455/422.1 |
| 2011/0281571 A1* | 11/2011 | Patel et al. | 455/418 |
| 2011/0281574 A1* | 11/2011 | Patel et al. | 455/422.1 |

* cited by examiner

*Primary Examiner* — Thai Hoang
(74) *Attorney, Agent, or Firm* — Kacvinsky Daisak PLLC

(57) ABSTRACT

Techniques are disclosed that provide for femto base stations to become synchronized with other base stations in a wireless network. For instance, a macro base station may instruct a mobile station to engage in a synchronization operation that synchronizes one or more timings (e.g., OFDM timings) of a femto base station with one or more corresponding timings of the macro base station. This may involve the mobile station having timing references of the macro base station. Further, this may involve the mobile station performing scanning operations and/or handover ranging operations with the femto base station. The mobile device may determine timing offsets between the femto BS and the macro BS. These offsets may be sent to the macro base station or to the femto base station. Also, the femto base station may adopt timings employed by the mobile station. The macro base station or a femto base station may direct a femto base station to achieve synchronization either directly with timing adjustment offset, or with a list of already synchronized femto base station as synchronization reference.

17 Claims, 5 Drawing Sheets